United States Patent
Ishikawa et al.

(10) Patent No.: US 7,993,227 B2
(45) Date of Patent: Aug. 9, 2011

(54) HUB FOR POWER TRANSMISSION APPARATUS

(75) Inventors: Keiji Ishikawa, Okazaki (JP); Yasuo Tabuchi, Toyoake (JP); Michiyasu Nosaka, Anjo (JP); Motohiko Ueda, Okazaki (JP); Takayuki Suzuki, Hekinan (JP); Yoshiki Tada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 401 days.

(21) Appl. No.: 12/155,245

(22) Filed: May 30, 2008

(65) Prior Publication Data

US 2008/0305905 A1 Dec. 11, 2008

(30) Foreign Application Priority Data

Jun. 6, 2007 (JP) ................................. 2007-150247

(51) Int. Cl.
*F16H 55/49* (2006.01)
(52) U.S. Cl. ....................... 474/168; 474/170
(58) Field of Classification Search .................. 474/166, 474/168, 170

See application file for complete search history.

(56) References Cited

U.S. PATENT DOCUMENTS

| | | | | |
|---|---|---|---|---|
| 2006/0084541 A1* | 4/2006 | Nosaka et al. | ................. | 474/170 |
| 2006/0217203 A1* | 9/2006 | Nosaka et al. | ................. | 464/30 |
| 2007/0270257 A1* | 11/2007 | Tada et al. | ................. | 474/70 |
| 2008/0305905 A1* | 12/2008 | Ishikawa et al. | ................. | 474/170 |
| 2008/0312018 A1* | 12/2008 | Nakata et al. | ................. | 474/161 |
| 2009/0186728 A1* | 7/2009 | Nosaka et al. | ................. | 474/166 |
| 2009/0258741 A1* | 10/2009 | Nosaka et al. | ................. | 474/178 |

FOREIGN PATENT DOCUMENTS

| | | |
|---|---|---|
| JP | A-2001-124176 | 5/2001 |
| JP | A-2006-258109 | 9/2006 |

OTHER PUBLICATIONS

Office Action dated May 12, 2009 from the Japan Patent Office in the corresponding JP Application No. JP-A-2007-150247 (and English Translation).

\* cited by examiner

*Primary Examiner* — Sang Kim
(74) *Attorney, Agent, or Firm* — Posz Law Group, PLC

(57) ABSTRACT

A hub for use in a power transmission apparatus comprises cylindrical portion 81 and outer ring 83 including a plurality of tongue-like reinforcing portions 83c each protruded radially inward from the peripheral end of the corresponding one of the plurality of protrusions 83b. When the distance from point C where the rear-side end surface of the cylindrical portion 81 and hub-side engaging portion 85 are connected with each other, to rear-side end surface D of reinforcing portions 83c is given a, and the distance from rear-side end surface D of reinforcing portions 83c to radially innermost front-side portion E is given b, distance b is less than one half of distance a.

8 Claims, 4 Drawing Sheets

FRONT SIDE ⟵⟶ REAR SIDE

HUB FOR POWER TRANSMISSION APPARATUS

BACKGROUND OF THE INVENTION

1. Field of the Invention

This invention relates to a hub for use in a power transmission apparatus having a function of damping vibration and absorbing shock during power transmission.

2. Description of the Related Art

Generally, a compressor for an air conditioner system of an automotive vehicle includes a power transmission apparatus for receiving power from an external source, such as an engine via a pulley and belt, and transmitting it to the input shaft of the compressor through a hub.

A conventional power transmission apparatus of this type is disclosed, for example, in Japanese Unexamined Patent Publication No. 2006-258109. This power transmission apparatus is shown in FIG. 4. Power transmission apparatus 11 has cylindrical bearing support unit 15 projected toward the front side (left side in FIG. 4) from compressor housing 13. Pulley 19 is supported through bearing 17 on an outer periphery of bearing support unit 15 and driven through a belt or the like by a power source such as an engine.

Input shaft 23 of the compressor is supported through bearing 21 on an inner periphery of bearing support unit 15. Inner hub 27 of hub 25 is screwed to input shaft 23, and cylindrical portion 29 formed of an elastic body is arranged on the outer periphery of inner hub 27. Outer ring 31 extending rearward (right side in FIG. 4) from cylindrical portion 29 is arranged on the outer periphery of cylindrical portion 29. Outer ring 31 is fitted in annular depression portion 33 formed on the front side of pulley 19.

First hub-side engaging portion 35, having depressions on the outer periphery thereof, is formed on the outer periphery of the rear-side portion of outer ring 31. Second hub-side engaging portion 37, having depressions on the inner periphery thereof, is formed on the inner periphery of the rear-side portion of outer ring 31.

A radially outward surface of depression portion 33 of pulley 19 is formed with first pulley-side engaging portion 39 adapted to engage first hub-side engaging portion 35, while the radially inward surface of depression portion 33 is formed with second pulley-side engaging portion 41 adapted to engage second hub-side engaging portion 37.

In this power transmission apparatus, torque transmitted from the power source to pulley 19 through the belt is transmitted to first and second hub-side engaging portions 35, 37 from first and second pulley-side engaging portions 39, 41 thereby to rotate input shaft 23 and thus drive the compressor. In this transmission process, the function of damping vibration and shock is carried out by cylindrical portion 29 having an elastic body.

In recent years, there is an increasing demand to reduce vehicle noises, and in order to reduce the noises, a spring constant of an elastic body is required to be smaller. To reduce the spring constant of the elastic body, cylindrical portion 29 of hub 25 formed of the elastic body is required to be increased in the radial direction.

However, due to space limitation, cylindrical portion 29 of hub 25 cannot be increased in the radial direction. If the spring constant of the elastic body is reduced without changing the outer diameter of cylindrical portion 29 of hub 25, the durability of the elastic body would be lowered thereby.

On the other hand, in order to increase the outer diameter of cylindrical portion 29, it is necessary to bend inward the tongue-like reinforcing portions, instead of bending them outward from outer ring 31 (as FIG. 7 in Japanese Unexamined Patent Publication No. 2006-258109). If the tongue-like reinforcing portions are bent inward, stress and strain are concentrated at the root of the cylindrical rubber portion of the engaging portion, and the strain would be further concentrated if the axial distance is shorten between the root and the reinforcing portion, thereby resulting in reduced durability.

SUMMARY OF THE INVENTION

The object of this invention is to solve the problem described above and provide a hub for use in a power transmission apparatus wherein there is less stress concentration between the cylindrical portion and the engaging portion, even if the reinforcing portions are protruded from the outer ring protrusions radially inward. Accordingly, it is possible to increase durability of the apparatus.

In order to solve the problem and achieve the object described above, according to one aspect of the invention, there is provided a hub for use in a power transmission apparatus comprising:

an inner hub (79) having a rigid body;

a cylindrical portion (81) having an elastic body formed on the outer periphery of the inner hub (79);

an outer ring (83) including an outer ring body (83a) formed cylindrically on the outer periphery of the cylindrical portion (81), a plurality of protrusions (83b) each protruded axially rearward from the corresponding one of the positions in peripherally spaced relationship with each other on the outer ring body (83a) and a plurality of tongue-like reinforcing portions (83c) each protruded radially inward from the peripheral end of the corresponding one of the plurality of the protrusions (83b); and a hub-side engaging portion (85) formed of an elastic body along the protrusions (83b) from the cylindrical portion (81) and adapted to engage a pulley-side engaging portion;

wherein the distance from the point (C) where the rear-side end surface of the cylindrical portion (81) and the hub-side engaging portion (85) are connected with each other, to the rear-side end surface (D) of the reinforcing portions (83c) is a, and the distance from the rear-side end surface (D) of the reinforcing portions (83c)

to the radially innermost front-side portion (E) is b, then the distance b is less than one half of the distance a.

More preferably, the distance (X) from the point (C) where the rear-side end surface of the cylindrical portion (81) and the hub-side engaging portion (85) are connected with each other to the radially innermost portion (E) of the reinforcing portions (83c) is not less than 3 mm.

By adopting this means, stress and strain are prevented from being concentrated at the portion connected between the cylindrical portion (81) and the hub-side engaging portion (85), in addition to improved durability. As a result, the reinforcing portions (83c) can be bent radially inward, so that the spring constant of the elastic body can be reduced without reducing the diameter of the hub (77) or increasing the diameter of the hub (77) and the pulley (59).

According to another aspect of the invention, in order to solve the above-mentioned problem, there is provided a hub for use in the power transmission apparatus, wherein the reinforcing portions (83c) are formed at the peripheral ends of the protrusions (83b). The concentration of stress and strain can thus be further prevented, resulting in an improved durability.

According to still another aspect of the invention, in order to solve the above-mentioned problem, there is provided a hub for use in a power transmission apparatus, wherein the front-side edge of each of the reinforcing portions (83c) is progressively tilted radially inwardly from front side to rear side.

As a result, the concentration of stress and strain on the portion between the cylindrical portion (81) and each reinforcing portion (83c) can be prevented for an improved endurance.

According to another aspect of the invention, in order to solve the above-mentioned problem, there is provided a hub for use in a power transmission apparatus comprising:
 an inner hub (79) having a rigid body;
 a cylindrical portion (81) having an elastic body formed on the outer periphery of the inner hub (79);
 an outer ring (83) including
  an outer ring body (83a) formed cylindrically on the outer periphery of the cylindrical portion (81), and
  a plurality of protrusions (83b) each protruded axially rearward from the corresponding one of the positions in peripherally spaced relationship with each other on the outer ring body (83a); and
 a hub-side engaging portion (85) having an elastic body along the protrusions (83b) from the cylindrical portion (81) and adapted to engage a pulley-side engaging portion;
 wherein the protrusions (83b) further include leg portions (83c, 83d) protruded radially inward and
 a corner of the leg portions (83c, 83d) being opposed to a point (C) where the rear-side end surface of the cylindrical portion (81) and the hub-side engaging portion (85) is connected with each other, is tilted.

By adopting the aforementioned means, the stress and strain are prevented from being concentrated at the portion connected between the cylindrical portion (81) and the hub-side engaging portion (85) and the hub-side engaging portion (85), in addition to an improved durability.

As a result, the reinforcing portions (83c) can be bent radially inward, thereby producing substantially the same effect as the first aspect of the invention described above.

The reference numerals inserted in the parentheses following the names of the respective means described above represent an example of correspondence with the specific means of the embodiments described later.

The present invention may be more fully understood from the description of preferred embodiments of the invention, as set forth below, together with the accompanying drawings.

DESCRIPTION OF THE PREFERRED EMBODIMENTS

The embodiments of the invention are explained below with reference to FIGS. 1 to 3.

Figure 1:
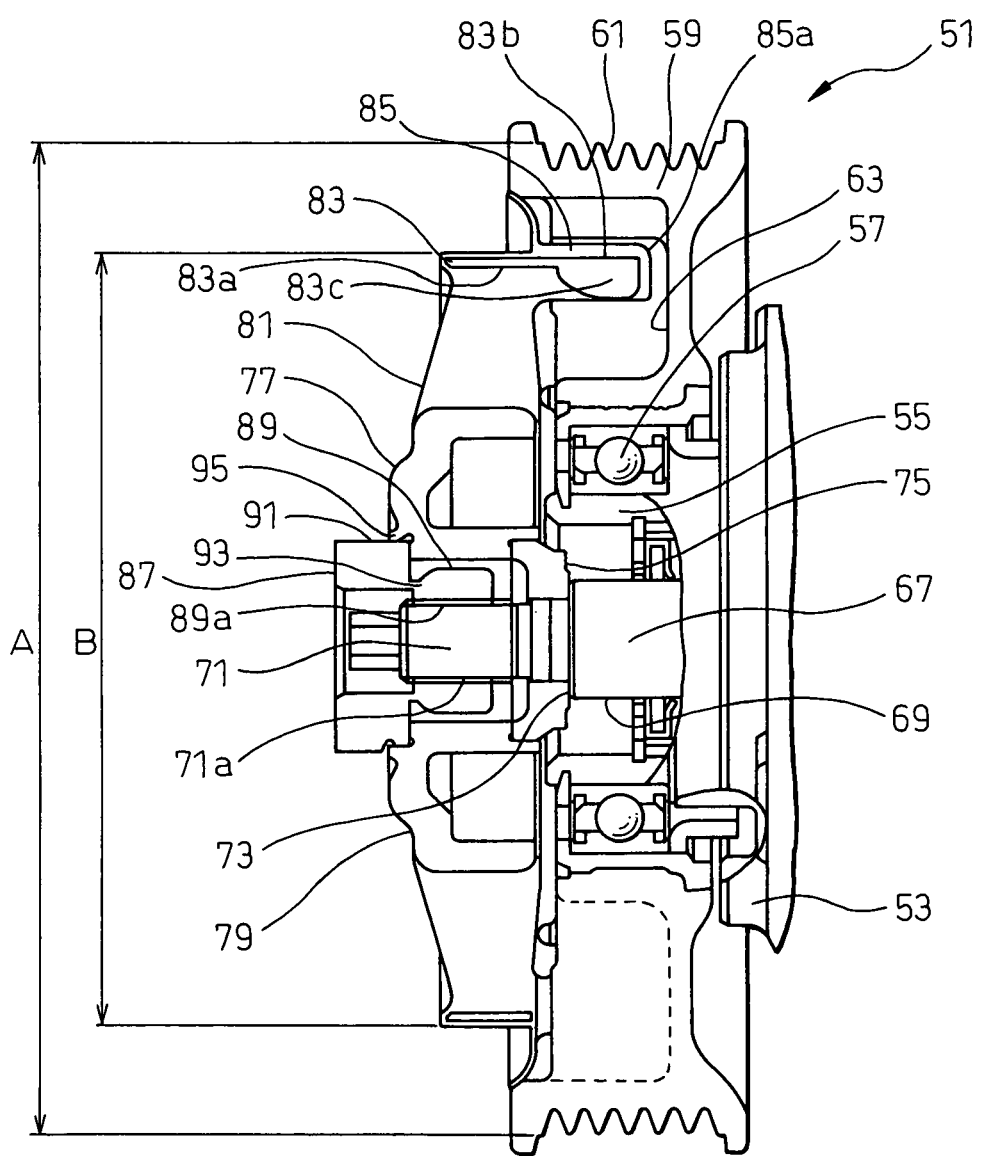
FIG. 1 is a longitudinal sectional view showing a power transmission apparatus having the hub according to the embodiment of the invention.
Figure 2:
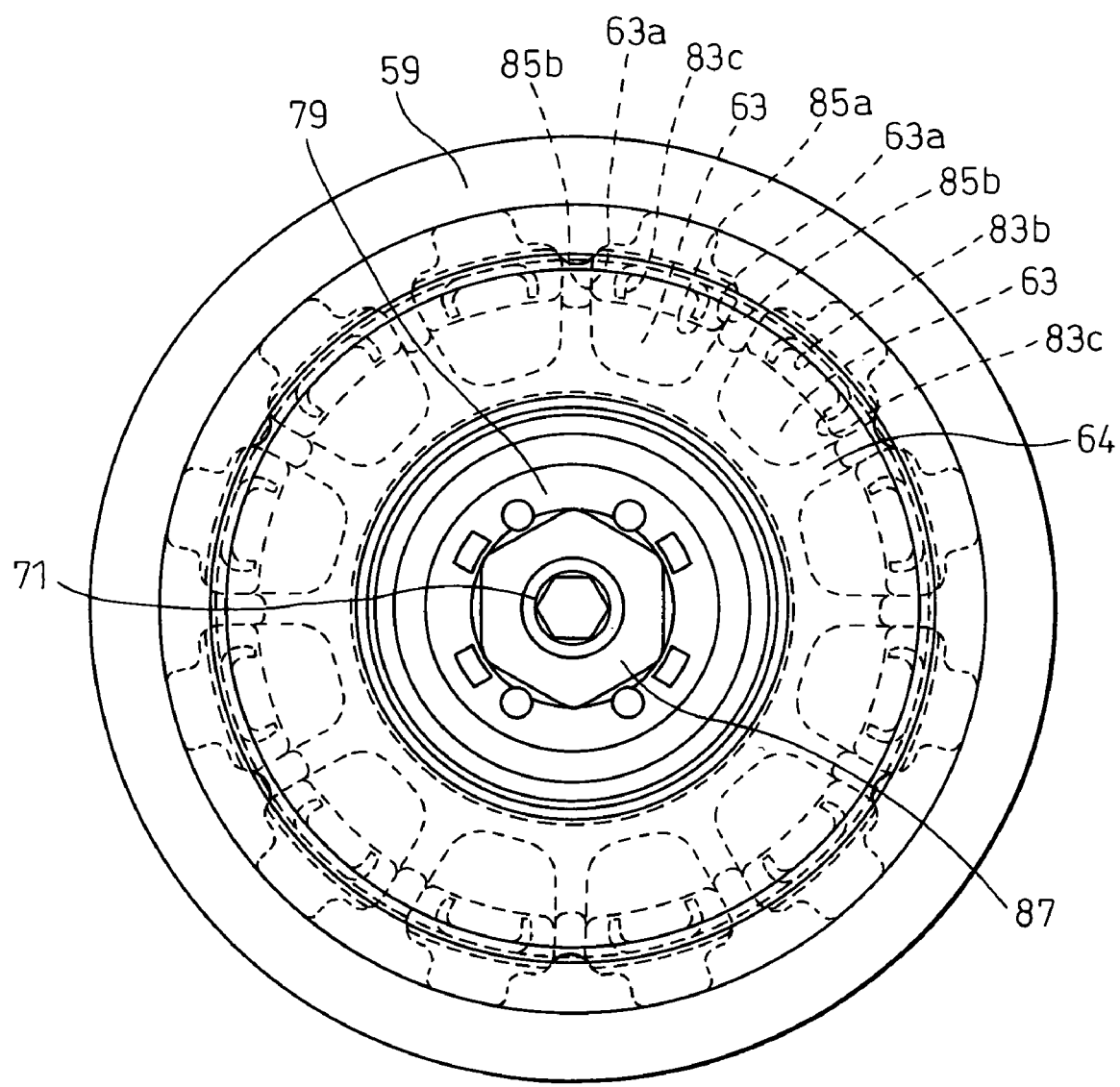
FIG. 2 is a side view of the power transmission apparatus shown in FIG. 1.
Figure 3:
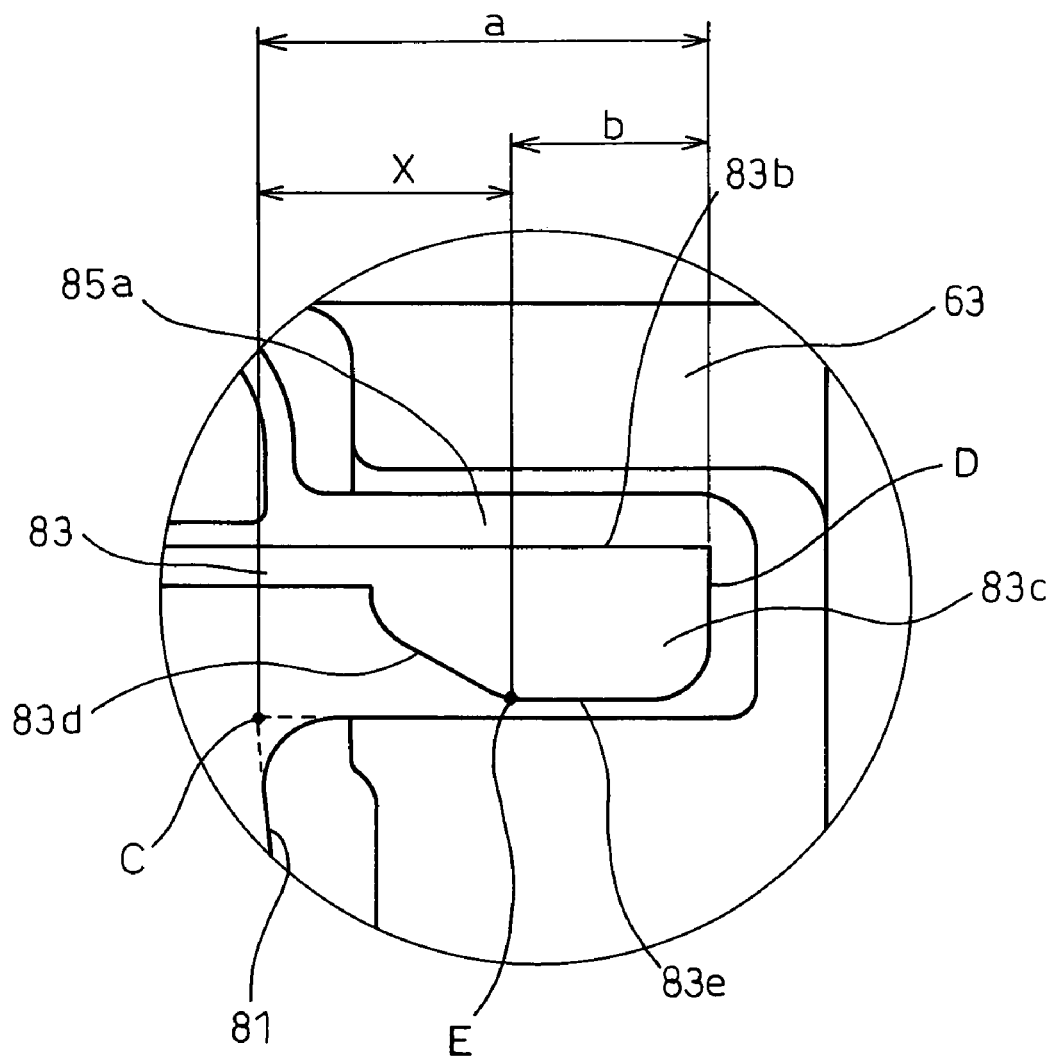
FIG. 3 is an enlarged side view showing the essential parts of the hub for use in the power transmission apparatus shown in FIG. 1.

FIGS. 1 to 3 show power transmission apparatus 51 having a hub according to an embodiment of the invention. Power transmission apparatus 51 includes compressor housing 53. Cylindrical bearing support portion 55 is arranged on front side (left side in FIG. 1) of the housing 53. Pulley 59 is supported through radial bearing 57 on the outer periphery of bearing support portion 55. Belt grooves 61 are formed on the outer periphery of pulley 59, and the belt is wound along belt grooves 61 thereby to transmit the rotational torque from the vehicle engine or the like. The diameter A of pulley 59 is approximately 100 to 130 mm.

A plurality of pockets 63 are formed equidistantly along the peripheral direction on the front side of pulley 59. The side walls of pockets 63, which are peripherally opposed to each other, form pulley-side engaging surfaces 63a, and rib 64 is formed between each pair of adjoining pockets 63.

Input shaft 67 for transmitting the power to the compressor in housing 53 is supported on the inside of cylindrical bearing support portion 55. Input shaft 67 has large-diameter portion 69 on rear side (right side in FIG. 1) and small-diameter portion 71 on front side. Stepped surface 73 is formed between large-diameter portion 69 and small-diameter portion 71, and external thread 71a is formed on the outer periphery of small-diameter portion 71.

Washer 75 is fitted on small-diameter portion 71 in contact with stepped surface 73, and hub 77 of the power transmission apparatus is fitted on washer 75.

Hub 77 for the power transmission apparatus includes metal inner hub 79 extending from washer 75 to the front side and further extending radially outward. Annular cylindrical portion 81 of an elastic material such as rubber is arranged on the outer periphery of inner hub 79. Cylindrical portion 81 has the function of damping the rotational variations, i.e. a damper to absorb the vibration, shock.

Metal outer ring 83 is arranged on the outer periphery of cylindrical portion 81 in order to stabilize the quality of cylindrical portion 81. Outer ring 83 is configured of outer ring body 83a, a plurality of protrusions 83b and reinforcing portions 83c.

Outer ring body 83a is formed cylindrically on the outer periphery of cylindrical portion 81. The plurality of protrusions 83b are formed in such a manner as to be protruded axially rearward from outer ring body 83a. Protrusions 83b are equidistantly spaced with each other along the outer peripheral direction of outer ring body 83a. Each reinforcing portions 83c is formed by being protruded radially inward in tongue-like shape from each of the peripheral ends of protrusions 83b. Outer ring 83 is integrally covered with the same elastic material, such as rubber, as cylindrical portion 81 by means of insert molding, thereby making up uneven rubber portions 85.

Uneven rubber portion 85 includes protrusions 85a fitted into pockets 63 of pulley 59, and the peripheral ends of each protrusion 85a are configured as hub-side engaging surfaces 85b. Hub-side engaging surfaces 85b are engaged with pulley-side engaging surfaces 63a of pulley 59, so that the torque of pulley 59 is transmitted to hub 77 in the power transmission apparatus. Outer ring 83, which is covered with an elastic material such as rubber, has the outer diameter B of 80 to 120 mm.

Power interruption member 87 is arranged on the inside of annular inner hub 79. Power interruption member 87 includes cylindrical portion 89, nut portion 91 and breaking portion 93. Cylindrical portion 89 has internal thread 89a screwed to external thread 71a of small-diameter portion 71. Nut portion 91 is in contact with the front side surface of inner hub 79. Nut portion 91 is connected through the breaking portion 93 to cylindrical portion 89.

If internal thread 89a of power interruption member 87 is screwed into external thread 71a of small-diameter portion 71, nut portion 91 is pressed against inner hub 79, thereby pressing inner hub 79 against stepped surface 73 through washer 75. Numeral 95 designates a caulked portion for preventing nut 91 from coming off.

In this way, the rotational torque transmitted to pulley 59 can be transmitted to input shaft 67 thereby to activate the compressor or the like.

In the case that the input shaft is locked due to malfunction of a compressor such as burning, an excessive torque is generated between pulley 59 and input shaft 67. This excessive torque causes a slippage between washer 75 and stepped surface 73, thereby causing the relative rotation between internal thread 89a and external thread 71a. This relative rotation causes cylindrical portion 89 to be screwed toward large-diameter portion 69. By this rearward movement, a large force is applied between cylindrical portion 89 and nut portion 91, thereby breaking portion 93. Thus, inner hub 79 can no longer be pressed against stepped surface 73 through washer 75, so that the torque transmission is cut off.

In hub 77 for the power transmission apparatus described above, each reinforcing portion 83c of outer ring 83 is formed in the following relationship as shown in FIG. 3.

When the distance
from the point C where the rear-side end surface of cylindrical portion 81 and protrusion 85a of uneven rubber portion 85 are connected with each other
to rear-side end surface D of corresponding reinforcing portion 83c
is given a, and
the distance from rear-side end surface D to front-side edge E of radially innermost portion 83e of reinforcing portion 83c is given b,
each reinforcing portion 83c is formed in such a manner that distance b is less than one half of distance a.

Furthermore, distance X from point C to front-side edge E is larger than 3 mm. The front-side edge of each of the reinforcing portions 83c is progressively tilted radially inwardly from the front side to the rear side.

Since hub 77 for the power transmission apparatus has the above relationship, the stress concentration at the portion of C can be relieved. Therefore, the durability of the cylindrical rubber portion can be improved and the reinforcing portions 83c are bent radially inward without the aforementioned problems.

Furthermore, according to this embodiment, the spring constant of the elastic body can be reduced without increasing the diameter of hub 77 and pulley 59 of the power transmission apparatus, and therefore noise can be reduced. Since slope 83d is formed on each reinforcing portion 83c, the stress concentration at the portion of C can be relieved.

Although the embodiments described above represent an application of the hub to the power transmission apparatus shown in FIG. 1, the invention is not necessarily limited to this application.

Figure 4:
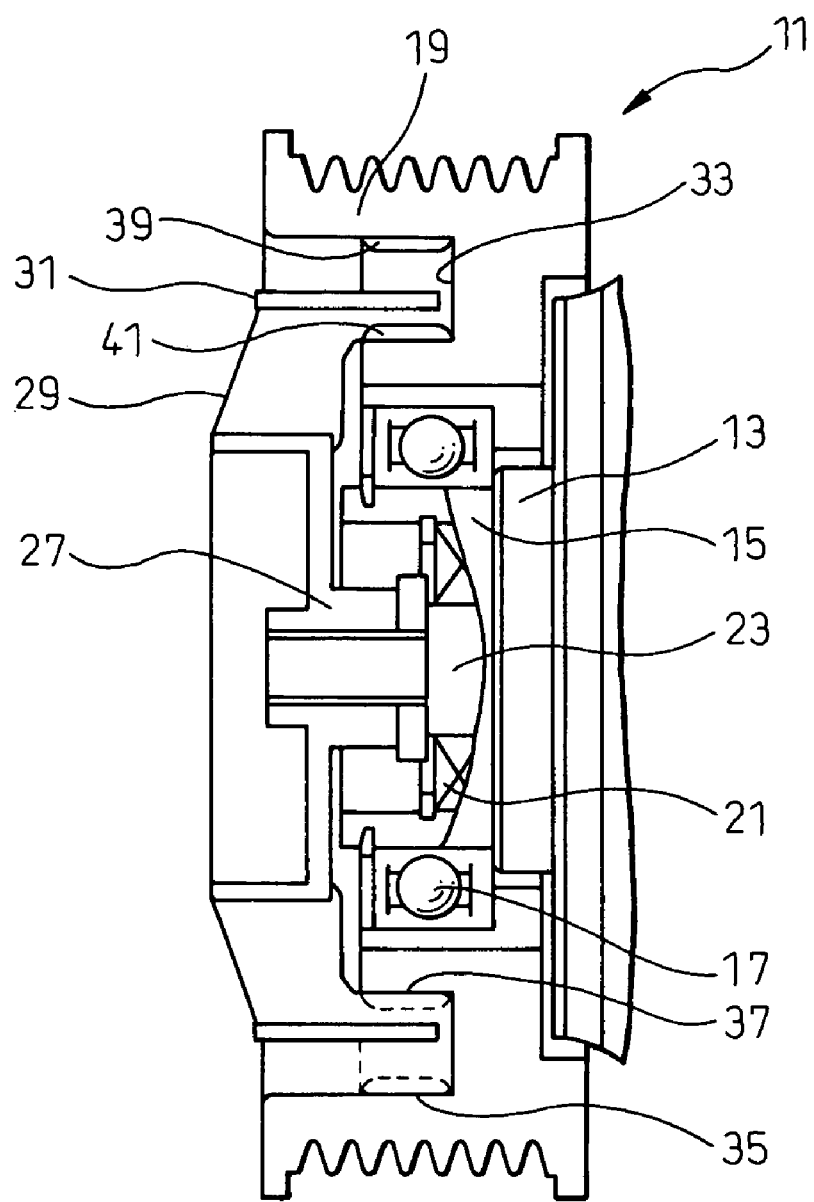
FIG. 4 is a longitudinal sectional view of a power transmission apparatus having the conventional hub.

Further, as shown in FIG. 4, the invention is also applicable to the power transmission apparatus having no power interruption member. In other words, the invention is applicable to the hub and the pulley regardless of the presence or absence of the inner hub, the power interruption member, the input shaft or the washer or in any shape.

While the invention has been described by reference to specific embodiments chosen for purposes of illustration, it should be apparent that numerous modifications could be made thereto by those skilled in the art without departing from the basic concept and scope of the invention.

The invention claimed is:

1. A hub for use in a power transmission apparatus, comprising:
   an inner hub having a rigid body;
   a cylindrical portion having an elastic body formed on an outer periphery of the inner hub;
   an outer ring including
      an outer ring body formed cylindrically on the outer periphery of the cylindrical portion,
      a plurality of protrusions each protruded axially rearward from the corresponding one of the positions in peripherally spaced relationship with each other on the outer ring body and
      a plurality of tongue-shaped reinforcing portions each protruded radially inward from the peripheral end of the corresponding one of the plurality of the protrusions; and
   a hub-side engaging portion formed of an elastic body along the protrusions from the cylindrical portion and adapted to engage a pulley-side engaging portion;
   wherein the distance
      from the point where a rear-side end surface of the cylindrical portion and the hub-side engaging portion are connected with each other,
      to a rear-side end surface of the reinforcing portions is a,
      and the distance
      from the rear-side end surface of the reinforcing portions to a radially innermost front-side portion is b,
   then the distance b is less than one half of the distance a.

2. The hub for use in the power transmission apparatus according to claim 1, wherein the distance from the point where the rear-side end surface of the cylindrical portion and the hub-side engaging portion are connected with each other, to the radially innermost portion of the reinforcing portions is not less than 3 mm.

3. The hub for use in the power transmission apparatus according to claim 1, wherein the reinforcing portions are formed at the peripheral ends of the protrusions.

4. The hub for use in the power transmission apparatus according to claim 1, wherein the front-side edge of each of the reinforcing portions is progressively tilted radially inwardly from the front side to the rear side.

5. A hub for use in a power transmission apparatus, comprising:
   an inner hub having a rigid body;
   a cylindrical portion having an elastic body formed on an outer periphery of the inner hub;
   an outer ring including
      an outer ring body formed cylindrically on the outer periphery of the cylindrical portion, and
      a plurality of protrusions each protruded axially rearward from the corresponding one of the positions in peripherally spaced relationship with each other on the outer ring body; and
   a hub-side engaging portion having an elastic body along the protrusions from the cylindrical portion and adapted to engage a pulley-side engaging portion;
   wherein each of the protrusions further includes a tongue-shaped reinforcing portion and a slope portion protruded radially inward, the slope portion is opposed to an area where a rear-side end surface of the cylindrical portion and the hub-side engaging portion is connected with each other, and a radial width of the slope portion progressively increasing from a front side to a rear side thereof.

6. The hub for use in the power transmission apparatus according to claim 5, wherein the slope portion is formed at a front side of the tongue-shaped reinforcing portion and an end surface of the slope portion is progressively tilted radially inwardly from the front side to the rear side.

7. A hub for use in a power transmission apparatus, comprising:

an inner hub having a rigid body;

a cylindrical portion having an elastic body formed on an outer periphery of the inner hub;

an outer ring including an outer ring body formed cylindrically on the outer periphery of the cylindrical portion, a plurality of protrusions each protruded axially rearward from the corresponding one of the positions in peripherally spaced relationship with each other on the outer ring body and a plurality of tongue-shaped reinforcing portions each protruded radially inward from a peripheral end of the corresponding one of the plurality of the protrusions; and a hub-side engaging portion formed of an elastic body along the protrusions from the cylindrical portion and adapted to engage a pulley-side engaging portion.

8. A hub for use in a power transmission apparatus, comprising:

an inner hub having a rigid body;

a cylindrical portion having an elastic body formed on an outer periphery of the inner hub;

an outer ring including an outer ring body formed cylindrically on the outer periphery of the cylindrical portion, a plurality of protrusions each protruded axially rearward from the corresponding one of the positions in peripherally spaced relationship with each other on the outer ring body and a plurality of tongue-shaped reinforcing portions each protruded radially inward from a peripheral end of the corresponding one of the plurality of the protrusions; and a hub-side engaging portion formed of an elastic body along the protrusions from the cylindrical portion and adapted to engage a pulley-side engaging portion;

wherein the distance from a point where the rear-side end surface of the cylindrical portion and the hub-side engaging portion are connected with each other, to a rear-side end surface of the reinforcing portions is a, and the distance from the rear-side end surface of the reinforcing portions to a radially innermost front-side portion is b, then the distance b is less than the distance a.

* * * * *